United States Patent [19]

Proctor

[11] 4,393,300
[45] Jul. 12, 1983

[54] HEATING CONTROL SYSTEM
[75] Inventor: Gary R. Proctor, Indianapolis, Ind.
[73] Assignee: Emhart Industries, Inc., Indianapolis, Ind.
[21] Appl. No.: 316,056
[22] Filed: Oct. 29, 1981
[51] Int. Cl.³ .............................................. H05B 1/02
[52] U.S. Cl. .................................. 219/497; 219/506; 219/501; 340/640; 340/384 R
[58] Field of Search ................ 219/497, 499, 507–510, 219/506, 501, 494, 490, 491, 492; 307/117; 340/584, 640, 384 R; 236/46 R

[56] References Cited
U.S. PATENT DOCUMENTS
4,314,143  2/1982  Bilstad et al. ........................ 219/497
4,322,594  3/1982  Brisson ................................ 219/506

FOREIGN PATENT DOCUMENTS
2904459  8/1980  Fed. Rep. of Germany ...... 219/506

Primary Examiner—M. H. Paschall
Attorney, Agent, or Firm—Robert F. Meyer; David W. Gomes

[57] ABSTRACT

A temperature detecting heating control system provides a temperature sensor, first and second voltage comparators for detecting a set point temperature and a warning temperature, and alarm circuitry for producing intermittent and predetermined period alarm signals in response to the detecting of the warning temperature and set point temperature respectively.

9 Claims, 1 Drawing Figure

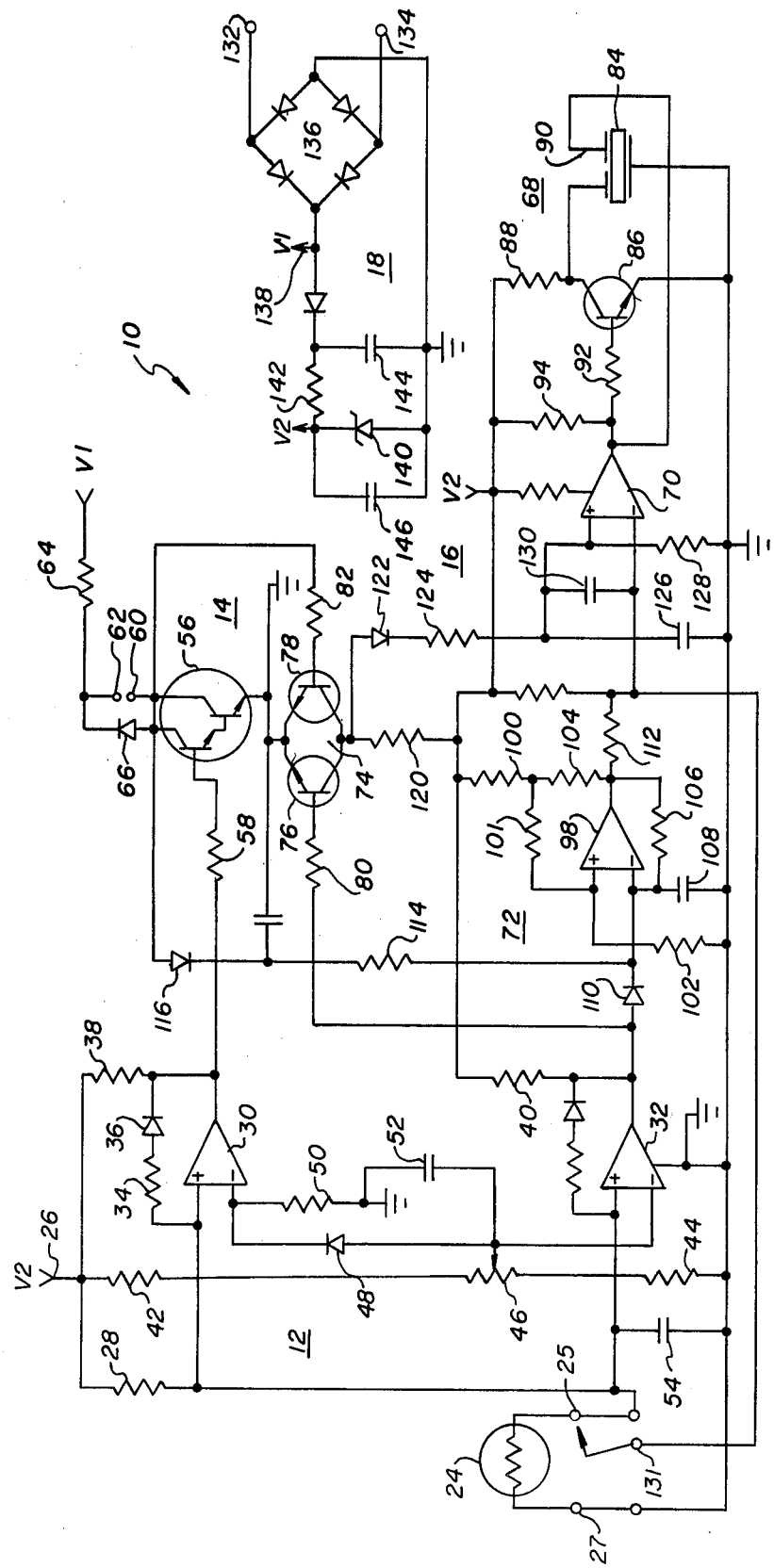

HEATING CONTROL SYSTEM

BACKGROUND OF THE INVENTION

1. Field of the Invention

This application generally relates to electronic heating control systems, and, in particular, to cooking systems employing alarm means to signal the end of the heating process.

2. Statement Of The Prior Art

Electronic heating control systems are well known and widely used. One common application of such controls in the area of cooking is ovens employing temperature sensors to detect when the material being heated has reached a desired temperature. Both microwave and convection ovens are examples of this application. Desirable characteristics for such types of heating control systems are as follows: a variable detection temperature for versatility; means for terminating the heating process once the detection temperature has been reached; an end-of-cycle indicator for signalling an operator that the desired temperature has been reached; a warning temperature indicator for signalling an operator that the heating cycle is close to completion; and easy variability of the included operational features for allowing a single heating system to be adaptable to a variety of general and special uses and to different levels of appliance complexity to reduce unit costs by the volume level of a wide variety of uses.

SUMMARY OF THE INVENTION

Accordingly, a temperature detecting heating control system provides a temperature sensor, first and second voltage comparator means each having an input coupled to said temperature sensor, means for generating a first variable reference voltage representing a variable set point temperature and a dependent, variable second reference voltage representing a warning temperature which is a predetermined number of degrees less than the set point temperature, the first and second reference voltages being respectively coupled to the first and second voltage comparator means, alarm means for producing a tonal alarm signal, and means for controlling the alarm means including means for causing the alarm means to produce an intermittent alarm signal in response to a sensor temperature between the warning temperature and the set point temperature and a constant alarm signal for a predetermined period of time in response to a sensor temperature above the set point temperature, the means for causing including a third voltage comparator means for controling the alarm means, low frequency oscillator means coupled to the third voltage comparator means for intermittently activating the alarm means and means coupled to the other input of the third voltage comparator means for maintaining activation of the alarm means for a predetermined period after the sensor temperature reaches the set point temperature.

BRIEF DESCRIPTION OF THE DRAWING

The present invention is described hereinbelow in relation to the appended drawing which is a schematic diagram of a circuit constructed in accordance with one embodiment thereof.

DETAILED DESCRIPTION OF THE DRAWING

The drawing shows a heating control system 10 which generally includes a temperature detection section 12, a power control section 14, an alarm section 16, and nominally, a power supply section 18.

The temperature detection section 12 generally includes terminals 25 and 27 for connection of a temperature sensor such as a thermistor 24. A voltage source V2 from power supply section 18 is coupled to a terminal 26 and applied to thermistor 24 through a resistor 28. Thermistor 24 is coupled to the circuit 10 via a pair of terminals 25 and 27. A pair of voltage comparators 30 and 32 each including a pair of input terminals and a single output terminal each also has one of their input terminals, the positive input, connected to the interconnection between resistor 28 and thermistor 24. Each comparator 30 and 32 further has a hysteresis feedback loop, coupled between the positive input terminal and the output terminal thereof, and including a resistor 34 and a diode 36 coupled in series and typically shown in respect to comparator 30. The outputs of comparators 30 and 32 are each further coupled to the voltage source V2 through a pair of resistors 38 and 40, respectively. The temperature detection section 12 further includes a voltage divider circuit including resistors 42 and 44 and a potentiometer 46 having fixed end terminals, coupled in series with resistors 42 and 44, and a variable wiper terminal forming the output of the voltage divider. This output is coupled directly to the negative input terminal of voltage comparator 32 to act as a reference voltage representing a warning temperature. The variable wiper terminal is further connected through a diode 48, which is intended to operate in a forward biased condition, to the negative input of voltage comparator 30. The reference voltage thus coupled to the negative input of comparator 30 represents a set point temperature, which temperature, due to the forward bias voltage drop of diode 48, is a few degrees higher than the warning temperature represented by the reference voltage coupled to the negative input of voltage comparator 32. The temperature detection circuit further includes a resistor 50 coupled between the negative input of comparator 30 and ground, a capacitor 52 coupled between the variable wiper terminal of potentiometer 46 and ground, and a capacitor 54 coupled between terminals 25 and 27 for thermistor 24.

Thusly, the output terminals of voltage comparators 30 and 32 generate signals depending upon whether the temperature of the thermistor 24 is below the warning temperature, between the warning temperature and the set point temperature or above the set point temperature. In this discussion, no distinction will be made as to the switching of comparators 30 or 32 either just below, at or just above the respective temperatures they represent, it being understood that these factors can be readily controlled depending upon the specific design selection of the reference voltages involved.

In operation, the voltage across thermistor 24 is inversely proportional to the temperature thereof. Therefore, the voltage present at the positive input terminals of voltage comparators 30 and 32 is relatively high with respect to the reference voltages prepresented at the negative inputs thereof when the thermistor is cold. As the thermistor heats up, the voltage presented at the positive input terminals drops and eventually drops below the reference voltages representing the warning and set point temperatures. The first temperature to be passed is the one represented by the higher reference voltage, which in this case is the warning temperature. When the temperature indicated by thermistor 24 reaches or passes the warning temperature, the output of voltage comparator 32 changes from a logical high to a logical zero. As the thermistor continues to heat up, its voltage drops further and eventually reaches the reference voltage coupled to the negative input of comparator 30, which reference voltage represents the set point temperature. At this point, the output of comparator 30 also changes from a logical high to a logical low. The reference voltage representing the warning temperature is lower than the reference voltage representing the set point temperature by the amount of the forward bias voltage across the diode 48 which is nominally 0.6 volts.

The output of comparator 30 is coupled to the power control section 14. Power control section 14 generally includes a semiconductor power switching device which in this case is a Darlington transistor 56. The output of comparator 30 is coupled through a resistor 58 to the control terminal of the Darlington transistor 56. One of the main terminals of the Darlington transistor 56 is coupled to ground and the other is coupled to an output terminal 60. Another output terminal 62 is coupled through a resistor 64 to a second voltage source V1 from the power supply section 18. Typically, the terminals 60 and 62 are intended for connection to the operating coil of a power switching relay. In accordance with this design, when the thermistor temperature reaches the set point temperature, and the output of comparator 30 changes from a logical high to a logical low, the Darlington transistor 56 is turned off and interrupts current flowing through any connected relay coil to thus disconnect heating power to the apparatus being controlled. A diode 66 is typically coupled across the terminals 60 and 62 for reverse voltage protection of the transistor circuitry from signals generated during the switching of relay current.

The alarm section 16 generally includes a tonal alarm means 68, a voltage comparator 70 for control of the tonal alarm means 68, a low frequency oscillator means 72 and a gate means 74. Gate means 74 includes a pair of transistor switches 76 and 78 each of which includes a control terminal coupled through respective resistors 80 and 82 to a different one of the output terminals of voltage comparators 30 and 32. The transistor switch 76 is coupled through resistor 80 directly to the output of voltage comparator 32, and the control terminal of transistor switch 78 is coupled through resistor 82 to the output of the Darlington transistor 56 which, as mentioned, is controlled by the output of voltage comparator 30. This coupling through the Darlington transistor 56 acts as a means for inverting the logical signal generated at the output terminal of voltage comparator 30. The transistor switches 76 and 78 have their emitter terminals coupled to ground and their collector terminals coupled in common. Thus, given the proper activation at the control terminals of transistor switches 76 and 78, the common collector terminals are grounded.

The tonal alarm means 68 generally includes a piezoelectric transducer 84 and a control transistor 86. The emitter of transistor 86 and one main terminal of transducer 84 are connected in common and to ground. The collector of transistor 86 is connected to another main terminal of transducer 84 and to the voltage source V2 through a resistor 88. A feedback terminal 90 of transducer 84 is coupled to the output terminal of voltage comparator 70, through a resistor 92 to the base terminal of transistor 86, and through a resistor 94 to the voltage source V2.

The low frequency oscillator means 72 includes a voltage comparator 98 having positive and negative input terminals and an output terminal. A voltage divider is formed by three resistors 100, 101 and 102 connected in series and between ground and the voltage source V2. The interconnection between resistors 101 and 102 is connected to the positive input terminal of comparator 98. The interconnection between resistors 100 and 101 is connected through another resistor 104 to the output terminal of comparator 98. An RC time constant circuit including a resistor 106 and a capacitor 108 is coupled to the output and negative input terminals of comparator 98, with resistor 106 coupled therebetween and capacitor 108 coupled between the negative input terminal and ground. The negative input terminal of comparator 98 is further coupled through an isolation diode 110 to the output of voltage comparator 32. During operation, when the output of voltage comparator 32 switches from a logical high to a logical low, the output of voltage comparator 98 is allowed to oscillate due to its several connected feedback circuits and thus produce a low frequency oscillation. This oscillating signal is coupled through a resistor 112 to the negative input of voltage comparator 70 to cause the tonal alarm means 68 to switch on an off at the low frequency oscillation rate, thereby forming a beeping tone from the alarm means 68. Further coupled to the negative input comparator 98 is a resistor 114 and an isolation diode 116 connected in series. The other end of diode 116 is coupled to the output of Darlington transistor 56 and thus is coupled to the output of voltage comparator 30. By these connections, the voltage comparator 98 is disabled from oscillation in response to the temperature of thermistor 24 reaching or surpassing the set point temperature as indicated by the output of voltage comparator 30.

Referring back to the transistor switches 76 and 78, the commonly connected collectors thereof are coupled to the voltage source V2 by a resistor 120. The voltage so coupled is further coupled through a diode 122 and a series connected resistor 124 to the positive input of voltage comparator 70. This voltage, thus applied, enables the comparator 70 to activate the tonal alarm means 68. When either of the transistor switches 76 or 78 is caused to conduct, their collectors are essentially coupled to ground and this activation voltage for the tonal alarm means 68 is also grounded. Thus when the temperature of the sensor is either below the warning temperature or above the set point temperature, the voltage at the collectors is grounded to inhibit activation of the tonal alarm means 68.

The alarm section 16 further includes means for maintaining activation of the tonal alarm means 68 for a predetermined period after the temperature of the sensor reaches the set point temperature as indicated by the grounding of the collector of transistor switch 78. This means for maintaining includes a capacitor 126 and a resistor 128. When the sensor temperature reaches the warning temperature and transistor switches 76 and 78 are both open, the voltage V2 is applied both to the positive input of voltage comparator 70 and across capacitor 126 causing the capacitor to charge. When the sensor temperature reaches the set point temperature and the collectors of transistor switches 76 and 78 are gounded, this voltage is cut off but the capacitor 126 acts as a charge storage means for maintaining activation of alarm means 68. The predetermined period for which the alarm is activated thereafter is determined by the time constant of capacitor 126 in combination with resistor 128 which forms an RC time constant circuit. In the present embodiment this time is nominally set for five seconds. A further capacitor 130 is coupled between the positive and negative input of voltage comparator 70 for the purpose of noise filtering. Thus it can be recognized that the function of diode 122 is to prevent discharge of the capacitor 126 through the transistor switch 78 to ground after the sensor temperature reaches the set point temperature.

A further feature is incorporated in the circuit design to disable alarm means 68 in the event that the thermistor 24 is disconnected or not in use. This feature includes a jack arrangement for connecting the thermistor 24 to the terminals 25 and 27. The jack arrangement includes a third terminal 131 which is coupled to the negative input of voltage comparator 70. When thermistor 24 is connected to terminals 25 and 27, as shown, terminal 131 is not coupled to anything. When thermistor 24 is disconnected, terminal 131 makes contact with terminal 25 causing a positive voltage to be applied to the negative input of comparator 70. This application causes the disabling of alarm means 28.

The circuit further nominally includes a power supply section 18 having terminals 132 and 134 for connection to a source of alternating current voltage. A full-wave bridge rectifier 136 is coupled thereto for generating the unfiltered voltage V1 at terminal 138. The voltage source V2 is generated across a zener diode 140 and is therefore a constant, regulated voltage. In the present embodiment, V2 equals approximately 9.1 volts. Resistor 142 and capacitors 144 and 146 provide voltage dropping and filtering for converting the 20 volt source to a 9.1 volt source.

In summary, the control circuit 10 operates in the following manner. Upon initial activation of the heating apparatus to which the control system 10 is connected, the voltage across thermistor 24 is a high positive value causing the outputs of both voltage comparators 30 and 32 to be a logical high. The output of voltage comparator 30 causes activation of Darlington transistor 56 and thus the application of voltage across terminals 60 and 62 to any relay connected thereto. This also causes the grounding of the collector terminals of Darlington transistor 56, the enabling of voltage comparator 98 via diode 116 and the turning off of transistor switch 78. With a logical high appearing at the output of voltage comparator 32, the low frequency oscillator means 72 is disabled. As the sensor temperature rises, the voltage at the positive inputs of comparators 30 and 32 drop until the reference voltage present in the negative input of comparator 32 is reached. At this point, the output of comparator 32 changes from a logical high to a logical low. This enables the low frequency oscillator means 72 to oscillate. It also turns off transistor switch 76 which allows the collector thereof to rise in response to voltage source V2. This voltage is then coupled to diode 122 and resistor 124 and to the positive input of voltage comparator 70, causing the output thereof to become a logical high and activate the tonal alarm means 68. The oscillations coupled from oscillator means 72 to the negative input of voltage comparator 70 cause the output of comparator 70 to also oscillate between a logical low and a logical high thus causing the tonal alarm means 68 to go on and off in an intermittent or beeping manner. As the sensor temperature continues to rise, the reference voltage present at the negative input of voltage comparator 30 is reached; whereupon the output of voltage comparator 30 changes from a logical high to a logical low. This causes the Darlington transistor 56 to switch off and discontinue current supply to the terminals 60 and 62, and thus to any relay coupled thereto. Further, the output terminal of Darlington transistor 56 switches from a logical low to a logical high causing the activation of transistor switch 78 and the grounding of voltage V2 coupled to the collector thereof. The logical high at the collector of Darlington transistor 45 is further coupled through diode 116 to the negative input of voltage comparator 98 causing deactivation of the low frequency oscillator means 72. This causes a logical low to appear at the negative input of voltage comparator 70. Thus, with transistor switch 78 switched on, the capacitor 126 contains a stored charge, which appears for a predetermined period as a positive voltage at the positive input of voltage comparator 70, causing the continuous activation of tonal alarm means 68 for a predetermined period of time. Again, this predetermined period of time is determined by the time constant of capacitor 126 in combination with resistor 128. At a predetermined point in the discharge of capacitor 126, the tonal alarm means 68 ceases operation. Thus the continuous alarm is used to signal the end of the heating operation.

Thusly arranged, the circuit of the present invention provides a plurality of functions and a large amount of manufacturing flexibility. It is possible, with the present invention, to produce simpler control circuits having fewer operational functions but using the same circuit components and the same configuration of the circuit sections. For example, one of the most basic circuits which can be constructed includes thermistor 24, voltage comparator 30 and its associated biasing circuitry, and Darlington transistor 56 and its associated relay control circuit. This basic circuit would serve the function of switching off the heating process at the end of the heating cycle.

Another lesser circuit which could be constructed includes the basic circuit described immediately above in addition to the tonal alarm means 68 for signalling the end of the heating cycle. Various means of interconnection could be used between the comparator 30 and the alarm means 68.

Thusly constructed, the present invention provides a variety of configurations allowing manufacturing application flexibility. By this means, the control system of the present invention can be readily adapted for use in a variety of consumer and commercial applications having different levels of operational flexibility.

It should be kept in mind that the embodiment described above is intended to be taken in an illustrative and not a limiting sense and that various modifications and changes may be made to the described embodiment by someone skilled in the art without departing from the scope of the invention as defined in the appended claims.

What is claimed is:

1. A temperature detecting heating control system comprising:
   a temperature sensor;
   a first voltage comparator means having an output terminal and two input terminals;
   first means for coupling said temperature sensor to one input terminal of said first comparator means;
   a second voltage comparator means having an output terminal and two input terminals;

second means for coupling said temperature sensor to one input of said second comparator means;

means for generating a pair of dependently variable reference voltages, one of said reference voltages representing a variable set point temperature and being coupled to the other input terminal of said first comparator means, the other of said reference voltages representing a warning temperature, which is a predetermined number of degrees less than said set point temperature, and being coupled to the other input terminal of said second comparator means;

current switching semiconductor means coupled to the output terminal of said first comparator means for controlling heating power in response to the temperature of said sensor reaching said set point temperature;

alarm means for producing a tonal alarm signal; and means for controlling said alarm means in response to the temperature of said sensor, said means for controlling including means for causing said alarm means to produce an intermittent alarm signal in response to the temperature of said sensor being between said warning temperature and said set point temperature and a constant alarm signal for a predetermined period of time in response to the temperature of said sensor reaching said set point temperature, said means for causing including third voltage comparator means having two input terminals and an output terminal coupled to control said alarm means, said means for causing also including low frequency oscillator means coupled between said second comparator means output terminal and one input terminal of said third comparator means for intermittently activating said alarm means and having disabling means coupled to said first comparator means output terminal for disabling said oscillator means when said temperature of said sensor reaches said set point temperature, said means for causing also including gate means for enabling activation of said alarm means only when the temperature of said sensor is between said warning temperature and said set point temperature, said means for causing further including means coupled to said third comparator means other input terminal for maintaining activation of said alarm means for said predetermined time period after the temperature of said sensor reaches said set point temperature.

2. The control system of claim 1, wherein said oscillator means includes a source of activation voltage coupled to said other input terminal of said third comparator means, and further wherein said gate means includes a pair of transistor switch means each having a control terminal coupled to a different one of said first and second voltage comparator means output terminals for grounding said source of activation voltage when the temperature of said sensor is less than said warning temperature or greater than said set point temperature.

3. The control system of claim 2, wherein said means for maintaining activation of said alarm means for said predetermined time period after the temperature of said sensor reaches said set point temperature includes charge storage means for storing an electrical charge from said source of activation voltage prior to the grounding thereof by said transistor switch means and for releasing said charge over said predetermined period for maintaining activation of said alarm means.

4. The control system of claim 3, wherein said charge storage means includes an RC circuit having a time constant determined in accordance with said predetermined time period.

5. The control circuit of claim 4, wherein said gate means includes diode means coupled between said transistor switch means and said charge storage means for preventing discharge of said electrical charge to ground through said transistor switch means.

6. The control circuit of claim 5, wherein said transistor switch means are identical transistor devices, and further comprising logic signal inversion means coupled between said first comparator means output terminal and said transistor switch means.

7. The control circuit of claim 1, further comprising coupling means between said temperature sensor and said one input of said third comparator means for disabling said alarm means upon disconnection of said temperature sensor from said control system.

8. The control system of claim 1, wherein said means for generating a pair of dependently variable reference voltages includes a voltage divider means having a variable voltage output means for producing said other reference voltage and also having a forward biased semiconductor junction coupled in series with said voltage output means for producing said one reference voltage.

9. The control system according to claim 1, wherein said oscillator means includes fourth voltage comparator means having an RC time constant controlled feedback path, and further wherein said first, second, third and fourth voltage comparator means are contained in a quad voltage comparator semiconductor integrated circuit.

* * * * *